Figure 1:
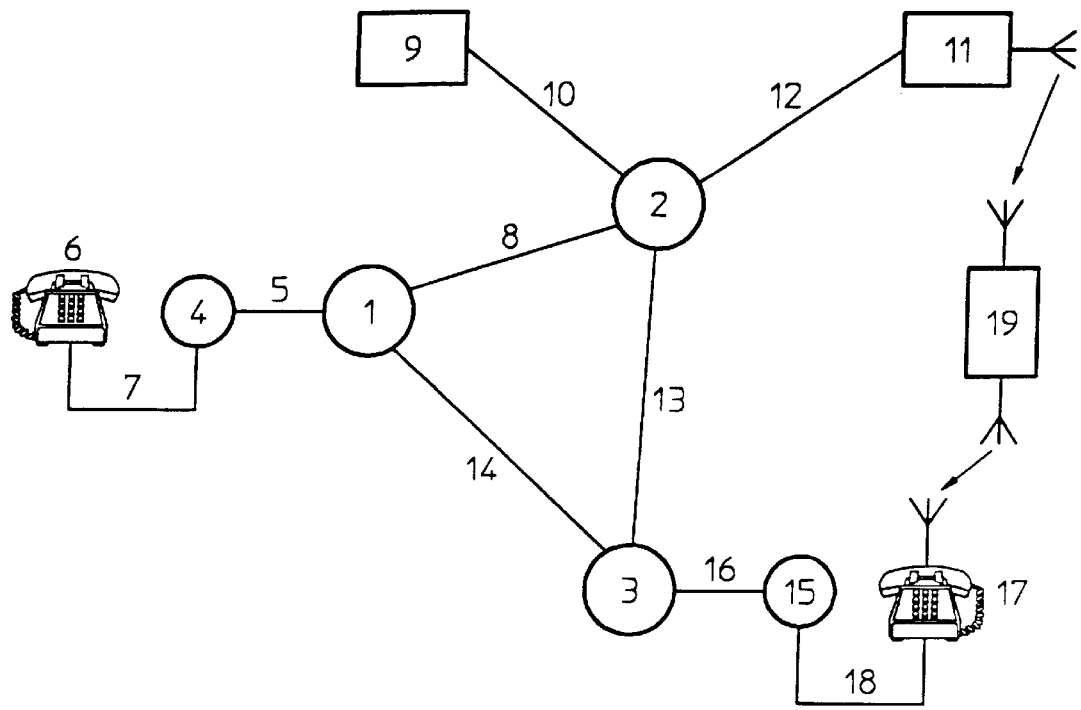

United States Patent [19]
Hegeman

[11] Patent Number: 5,884,161
[45] Date of Patent: Mar. 16, 1999

[54] METHOD FOR SETTING UP A COMMUNICATION CONNECTION BETWEEN A FIRST PARTY AND A CALLABLE SECOND PARTY, A TELECOMMUNICATION SYSTEM FOR APPLYING THE METHOD, AND A RECEIVING DEVICE FOR RECEIVING A CALL SIGNAL OF A CALL TRANSMITTER THEREFOR

[75] Inventor: Johannes Hegeman, Delft, Netherlands

[73] Assignee: Koninklijke PTT Nederland N.V., Groningen, Netherlands

[21] Appl. No.: 375,427

[22] Filed: Jan. 18, 1995

[30] Foreign Application Priority Data

Jan. 27, 1994 [NL] Netherlands ............... 9400118

[51] Int. Cl.⁶ .................................. H04Q 7/38
[52] U.S. Cl. .................. 455/414; 455/458; 455/560
[58] Field of Search .................... 379/56, 57, 58, 379/63, 220; 455/414, 417, 422, 403, 445, 458, 459, 460, 461, 31.3, 560

[56] References Cited

U.S. PATENT DOCUMENTS

| | | | |
|---|---|---|---|
| 5,090,051 | 2/1992 | Muppidi et al. | 379/61 |
| 5,414,750 | 5/1995 | Bhagat et al. | 379/57 |
| 5,430,790 | 7/1995 | Williams | 379/63 |
| 5,491,739 | 2/1996 | Wadin et al. | 379/57 |
| 5,557,652 | 9/1996 | Jonsson | 379/57 |

FOREIGN PATENT DOCUMENTS

| | | |
|---|---|---|
| 0 478 213 A3 | 4/1992 | European Pat. Off. . |
| 0 632 633 A1 | 1/1995 | European Pat. Off. . |
| 2 263 845 | 8/1993 | United Kingdom . |
| WO 93/05604 | 3/1993 | WIPO . |
| WO 93/18624 | 9/1993 | WIPO .................... 379/57 |

*Primary Examiner*—Dwayne Bost
*Assistant Examiner*—William G. Trost
*Attorney, Agent, or Firm*—Frishauf, Holtz, Goodman, Langer & Chick

[57] ABSTRACT

The method for setting up a communication connection in a universal personal telecommunication (UPT) system between a first party and a second party who can be called, often by a wire-free system, offers the possibility of setting up the communication connection without an internal network telephone number having to be transmitted concomitantly in a call signal by storing, in a memory, a relationship between the two parties and at least a section of a link situated between the first party and an exchange and by first reading out the memory in response to a code signal originating from the second party which is detected via a terminal and then to carrying out routing on the basis of the relationship read out.

18 Claims, 2 Drawing Sheets

5,884,161

METHOD FOR SETTING UP A COMMUNICATION CONNECTION BETWEEN A FIRST PARTY AND A CALLABLE SECOND PARTY, A TELECOMMUNICATION SYSTEM FOR APPLYING THE METHOD, AND A RECEIVING DEVICE FOR RECEIVING A CALL SIGNAL OF A CALL TRANSMITTER THEREFOR

A. BACKGROUND OF THE INVENTION

The invention relates to a method for setting up a communication connection between a first party and a callable second party, which method comprises the following steps of the reception by the first party of an identification signal for identifying the second party via an exchange, the activation of a call transmitter for transmitting a call signal to the second party, the reception by the second party of a code signal via a terminal, and the setting-up of a connection between the terminal and the exchange in response to the code signal.

Such a method is generally known. A first party (for example a user having a fixed telephone connection) generates an identification signal for identifying a second party (a user who can be called, often by wire-free means, and who can be reached, such as, for example, in the case of universal personal telecommunication or UPT, via one terminal after having identified himself at said terminal and can call from said terminal at his own expense), which identification signal is received by an exchange (possibly via one or more other exchanges) connected to the first party. Said exchange detects the identification signal and looks up (possibly via one or more other exchanges) in a table the number of the terminal at which the second party associated with the identification signal last identified himself. If no terminal at all is known at which the second party last identified himself or if the second party does not respond to the warning signal via such a known terminal, a call transmitter, such as, for example, a paging transmitter is activated, often by wire-free means, for example by a particular action of the first party, for the transmission of a call signal, such as, for example, a paging signal, to the second party. In response thereto, the second party replies at the nearest terminal by feeding a code signal to said terminal, which code signal comprises identification information of the second party and the number of the first party. For this purpose, either the number of the first party has to be known to the second party or said number of the first party has to be communicated to the second party via the call signal, such as, for example, a paging signal. On the basis of the number of the first party, the connection is then set up between the terminal and the first party, who has himself replaced the receiver in the meantime, after which the first and the second party are able to communicate mutually, for example at the expense of the second party.

Said known method has, inter alia, the disadvantage that the communication connection can be set up only if the second party has knowledge of the number of the first party, which number is transmitted to the first party, for example, via the call signal, such as a paging signal. For reasons of privacy, this concomitant transmission of the number is sometimes undesirable.

B. SUMMARY OF THE INVENTION

The object of the invention is, inter alia, to provide a method of the type referred to in the introduction in which the communication connection is set up without the second party being informed of the number of the first party.

For this purpose, the method according to the invention has the characteristic that it comprises the following steps of the storage of a relationship between the second party and at least a section of a link situated between the first party and the exchange at a location in a memory in response to at least a section of the identification signal, the reading-out of the location in the memory in response to the code signal, and the setting-up of the connection between the terminal and the exchange in response to the relationship.

As a result of storing a relationship between the second party and at least a section of a link situated between the first party and an exchange at a location in the memory in response to at least a section of the identification signal and as a result of first reading out the memory in response to a code signal, in which memory the relationship (between the second party and at least a section of a link situated between the first party and an exchange) is found at the location, a communication connection can then be set up between the first party and the second party via the link between the first party and the exchange. In this case, the code signal comprises identification information of the second party and might comprise further information, which is, however, not necessary per se. Such a code signal might be entered via a smart card and a smart card reader coupled to the terminal, or via the pushbuttons present at the terminal, or in another way known to the person skilled in the art. As regards the connection between the first party and the exchange, there are two possibilities. Firstly, said connection might still be open because the first party has remained on the line, in which case the first party obtains direct contact with the second party as soon as the communication connection between the terminal and the exchange is set up (the section, associated with the relationship, of the link situated between the first party and the exchange is then formed, for example, by an internal network number of the exchange and/or a number of a "holding point" of the exchange). Secondly, the first party might have already broken the connection to the exchange, in which case, as soon as the communication connection is set up between the terminal and the exchange, a new connection has to be set up from the exchange to the first party (the section, associated with the relationship, of the link situated between the first party and the exchange is then formed, for example, by the number of the first party).

The invention is based, inter alia, on the insight that a second party identifies himself at a terminal in a UPT system before the actual communication takes place and that it is possible to trace the relationship between the second party and at least a section of the link situated between the first party and the exchange on the basis of said identification information in a memory, after which only a routing from the terminal to the first party has to take place. In this case, identification information and identification signals may be used either directly or more indirectly via a translation table for their respective applications.

In GSM terminology, the memory might be a so-called home location register (HLR), which HLR should be dialled being determined on the basis of the identification information of the second party.

Of course, the invention is also applicable to situations in which the first party is provided with a wire-free communication handset, in which case said first party provided with a wire-free communication handset must not, however, leave the range of his telepoint base station after generating the identification signal.

GB 2 263 845 discloses a UPT system having a method for controlling such a system for assigning a unique personal telecommunication number (PTN) to a subscriber and for providing a UPT service via the network.

A first embodiment of the method according to the invention has the characteristic that the activation of the call transmitter for transmitting the call signal to the second party takes place in response to at least a section of the identification signal.

In this case, the exchange detects the fact that the identification signal corresponds to a call number or paging number, as a result of which no further action is required of the first party in calling the first party.

Modern exchanges, such as service switching points (SSPs), the control of which can be taken over by a service control point (SCP) which is connected to a service data point (SDP), or data base, are capable of coupling, optionally in combination with one or more SCPs, two open connections. Owing to this application, an SDP is available as memory. Furthermore, in contrast to standard exchanges (which are only capable of routing), SSPs, optionally in combination with one or more SCPs, are capable of recognizing special service requests, such as call numbers or paging numbers and are capable of taking action in response thereto, such as activating a call transmitter or paging transmitter.

A second embodiment of the method according to the invention has the characteristic that the call signal comprises an indication signal of one type in the case of an identification signal of one type, which call signal comprises an indication signal of another type in the case of an identification signal of another type.

As a result of providing a call signal or paging signal with an indication signal, the possibility is created of being able to indicate to the second party whether a call signal or paging signal should be responded to in a standard way (in the case of an indication signal of one type) or whether the call signal or paging signal should be responded to at a more advanced level (in the case of an indication signal of another type), or of the second party automatically being able to respond in a standard way or at an advanced level, or of a combination of the two options. An identification signal of one type comprises, for example, identification information of the second party and, in addition, the number of the first party or the internal network number of the exchange. An identification signal of another type comprises, for example, identification information of the second party and, moreover, an additional code generated by the first party (which indicates that the first party wishes to be accessed at an advanced level, regardless of whether or not the connection between the first party and the exchange has remained open, or which indicates that the first party will keep the connection with the exchange open, in which case the first party should in any case be accessed at an advanced level in any case), or a code generated by the exchange which indicates whether the connection between the first party and the exchange remains open, which can be detected, for example, on the basis of a line-current detection.

A third embodiment of the method according to the invention has the characteristic that the relationship is formed by a representation of at least a section of the link situated between the first party and the exchange, the location in the memory being determined by at least a section of the identification signal.

In this case, the relationship is formed, for example, by an internal network telephone number of a point in the exchange which is coupled to the link present between the first party and the exchange, addressing of the memory taking place on the basis of at least a section of the identification signal for identifying the second party. As a result, it is no longer necessary to read out the entire memory but the location in the memory where the relationship is stored can be read out directly on the basis of at least a section of the identification signal which functions as address.

The invention furthermore relates to a telecommunication system comprising at least one exchange, at least one call transmitter coupled to the exchange and at least one memory, a first party being capable of being coupled to the exchange via a link and a callable second party being capable of being coupled to the exchange via a terminal, which telecommunication system is provided with identification detection means for detecting an identification signal, originating from the first party, for identifying the second party, which telecommunication system is provided with the call transmitter for transmitting a call signal to the second party, and which telecommunication system is provided with code detection means for detecting a code signal originating from the second party via the terminal, and setting up a connection between the terminal and the exchange in response to at least a section of the code signal.

In this case, the identification detection means will, for example, be present in the exchange which is coupled (possibly via one or more other exchanges) to the call transmitter or paging transmitter and which is coupled to the first party via the link (possibly via one or more other exchanges). The code detection means are situated, for example, in the terminal or in the exchange which is coupled (possibly via one or more other exchanges) to the call transmitter or paging transmitter and which is coupled to the first party via the link (possibly via one or more other exchanges) or in another exchange coupled thereto (in these last two cases the terminal should transmit at least a section of the code signal to the exchange concerned). In this connection, the code signal comprises at least identification information of the second party.

The telecommunication system according to the invention has the characteristic that the telecommunication system is provided with means for the storage of a relationship between the second party and at least a section of the link situated between the first party and the exchange at a location in the memory in response to at least a section of the identification signal, the telecommunication system being provided with further means for consecutively reading out the location in the memory in response to the detection of the code signal, and setting up the connection between the terminal and the exchange in response to the relationship.

The characterizing means are situated, for example, in the exchange which is coupled (possibly via one or more other exchanges) to the call transmitter or paging transmitter and which is coupled (possibly via one or more other exchanges) to the first party via the link. The characterizing further means are situated, for example, in the terminal or in the exchange which is coupled (possibly via one or more other exchanges) to the call transmitter or paging transmitter and which is coupled (possibly via one or more other exchanges) to the first party via the link or in another exchange coupled thereto and are preferably situated in the direct vicinity of the code detection means.

A first embodiment of the telecommunication system according to the invention has the characteristic that the identification detection means are provided with activation means for the activation of the call transmitter for transmitting a call signal to the second party in response to at least a section of the identification signal.

Said activation means are situated, for example, in the exchange which is coupled (possibly via one or more other exchanges) to the call transmitter or paging transmitter and which is coupled (possibly via one or more other exchanges) to the first party via the link.

If the identification signal is formed, for example, by 06-5xxxxx, the call transmitter or paging transmitter will be activated, for example, in response to 06-5 (xxxxx determining, possibly via a translation table, which second party is called) and the relationship will be stored in the memory, for example, in response to 06-5 (xxxxx possibly also determining by means of a translation table which relationship is stored in which way). The identification signal might also comprise a combination of a fixed number and codes to be dialled thereafter (such as xxxxx and/or a code for identifying the first party).

A second embodiment of the telecommunication system according to the invention has the characteristic that the telecommunication system is provided with indication-signal generating means for the generation of an indication signal, associated with the call signal, of one type in the case of a detected identification signal of one type, and the generation of an indication signal, associated with the call signal, of another type in the case of a detected identification signal of another type.

In this case, the indication-signal generating means are situated, for example, in the exchange which is coupled (possibly via one or more other exchanges) to the call transmitter and which is coupled (possibly via one or more other exchanges) to the first party via the link. If the identification signal comprises a combination of a fixed number and codes to be dialled thereafter, one of said codes might, for example, indicate the identification signal of another type, and in another case, link detection means will actively monitor, for example, the line-current variation in the link and, in the case where line current is present, involve an identification signal of another type, for example by adding a code. Preferably, the indication-signal generating means (and optional link detection means) are situated in the direct vicinity of the identification detection means.

A third embodiment of the telecommunication system according to the invention has the characteristic that the relationship is a representation of at least a section of the link between the first party and the exchange, the location in the memory being determined by at least a section of the identification signal.

In this case, the relationship is formed, for example, by an internal network telephone number of a point in the exchange which is coupled to the link present between the first party and the exchange, addressing of the memory taking place on the basis of at least a section of the identification signal for identifying the second party. As a result, it is no longer necessary to read out the entire memory but the location in the memory where the relationship is stored can be read out directly on the basis of at least a section of the identification signal which functions as address.

The invention furthermore relates to a receiving device for the reception of a call signal of a call transmitter.

Such a receiving device is generally known, for example a paging receiver for the reception of a paging signal of a paging transmitter.

The receiving device according to the invention has the characteristic that the receiving device is provided with code-signal generating means for generating a code signal intended for a terminal in response to the call signal.

Because of the code-signal generating means for the generation of a code signal intended for a terminal in response to the call signal, such as a paging signal, the possibility is provided of the code signal intended for the terminal being generated automatically and without intervention of the second party, as a result of which identification information relating to the second party is automatically fed to the terminal. In this case, the code signal is not supplied in the above-stated way via the pushbuttons present on the terminal, but consideration should be given for example to feeding the code signal to the terminal via infrared/ultrasonic transmission, in which case, of course, the terminal should be provided with an infrared/ultrasonic receiver.

A first embodiment of the receiving device according to the invention has the characteristic that the receiving device is provided with indication-signal detection means coupled to the code-signal generating means for detecting an indication signal associated with the call signal and for generating a code signal of one type in response to an indication signal of one type and for generating a code signal of another type in response to an indication signal of another type.

The code signal of one type comprises, for example, the identification information of the second party and the number, dialled by the second party, of the first party, who is accessed in this case in a standard way, while the code signal of another type comprises, for example, the identification information of the second party and a fixed code. In response to said fixed code, the characterizing means of the telecommunication system according to the invention should then read out the location in the memory. Because of the presence of the code-signal generating means and the indication-signal detection means, a second party situated in the vicinity of a terminal can be connected (virtually completely) automatically and, for example, at the expense of a calling first party to said first party, and specifically, without the knowledge of an internal network number of the exchange and without the knowledge of the number of the first party.

In addition to the above mentioned infrared/ultrasonic transmission, there is furthermore the possibility of feeding the code signal in the above-stated way by means of the smart card to the terminal, which is provided with a smart-card reader, in which case the receiving device should be provided with a smart-card writer which writes a code signal of one type on the smart card as a function of an indication signal of one type and which writes a code signal of another type on the smart card as a function of an indication signal of another type. Of course, the smart card should in fact be placed by the second party in the smart-card reader associated with the terminal, in which case there is no longer a question of the code signal being fed to the terminal completely automatically.

EP 0 478 213 (in particular, FIG. 2) discloses a method in which a first party (for example, a user with a fixed telephone connection) generates an identification signal for identifying a callable second party (a user having a wire-free communication handset), which identification signal is received by an exchange connected to the first party (possibly via one or more other exchanges). Said exchange detects that the identification signal corresponds to a call number or paging number and routes the connection which is open between the first party and the exchange to a centrally situated exchange having so-called "holding points". Said centrally situated "holding point" exchange has a memory in which a relationship between the second party and at least a section of a link situated between the first party and the "holding point" exchange (or the number of the so-called "holding point") is stored in response to at least a section of the identification signal. A call transmitter or paging transmitter is then activated which transmits a call signal or paging signal which is intended for the second party and which comprises a telephone number of the centrally situated "holding point" exchange. In response to reception of the paging signal, the second party transmits a code signal which comprises the telephone number of the "holding point" exchange. A telepoint base station receives said code signal and, in response thereto, carries out routing to the centrally situated "holding point" exchange, where the "holding point" to which the second party should be connected is looked up in the memory. As soon as this has been done, the connection between the first and the second party is set up, and all the costs may be allocated to the first (calling) party. Such a "holding point" exchange might also be used in the case of the method according to the invention and in the telecommunication system according to the invention. In this case, however, the above mentioned problem is solved in a very disadvantageous way because the internal network telephone number of the "holding point" exchange should be concomitantly transmitted in the call signal or paging signal and/or should be made known to the second party, which is undesirable from the point of view of telephone companies, and because routing via a centrally situated "holding point" exchange is virtually always inefficient.

Another system which makes use of some inefficient "holding point" exchanges and of the concomitant transmission of the internal network telephone number of such an exchange in the paging signal is described in WO 93/07704, the term "meet me port" being used instead of the term "holding point".

C. REFERENCES

| Experiment | Proportion of polymer (>2500 g/mol)[1] [area-%][2] | Oligomeric isocyanurate-polyisocyanate[1] [area-%][2] | Other[1] [area-%][2] | D [area-%][2] |
|---|---|---|---|---|
| 1a) | approx. 60 | approx. 18 | approx. 22 | n.d. |
| 1b) | approx. 13 | approx. 82 | approx. 5 | n.d. |
| 1c) | approx. 29 | approx. 55 | approx. 15 | 0.8 |
| 1d) | n.d. | approx. 90 | approx. 9 | 0.6 |

[1] The molecular weight distribution of the polymeric proportions varies a little in the experiments, the average was in most cases above 10,000 g/mol; no investigations into the structure of these polymers were carried out (cf. also Y. Iwakura, K. Uno and K. Ichikawa, Journal of Polymer Science: Part A, 2, (1964) 3387–3404); in addition to isocyanurate polyisocyanates, compounds primarily containing uretdione groups, as well as reaction products of the catalysts or the catalyst solvents (summarized under 'Other') were present.
[2] area-% = area percentage according to GPC without monomer (not standardized); since except for D all species were obtained in the form of a more or less distinct series of oligomers partially overlapping with one another, more precise data was not possible.
n.d. not detectable.

All the references are deemed to be incorporated in this application.

D. EXEMPLARY EMBODIMENT

Figure 2:
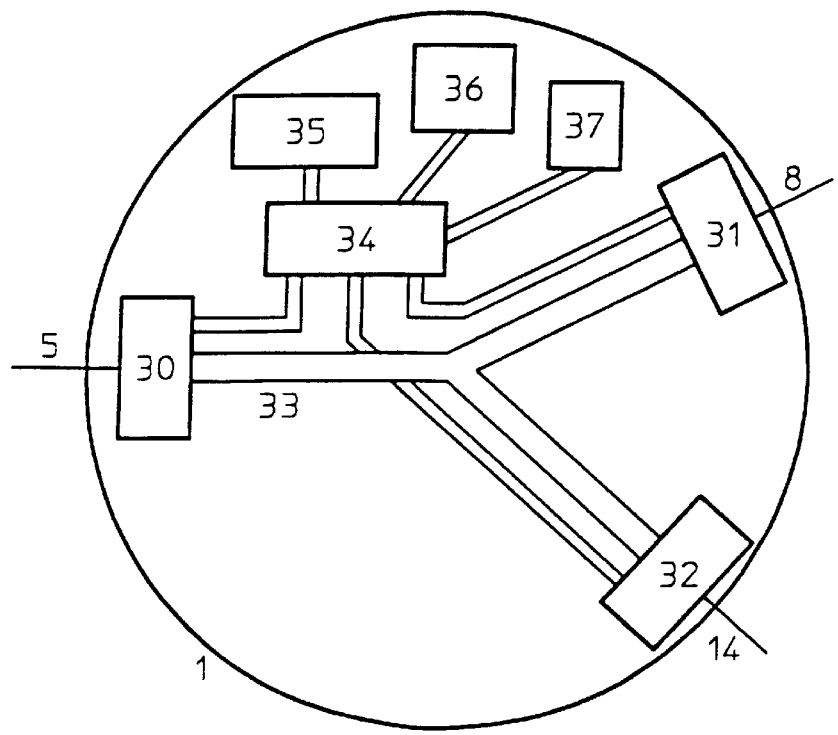
Figure 3:
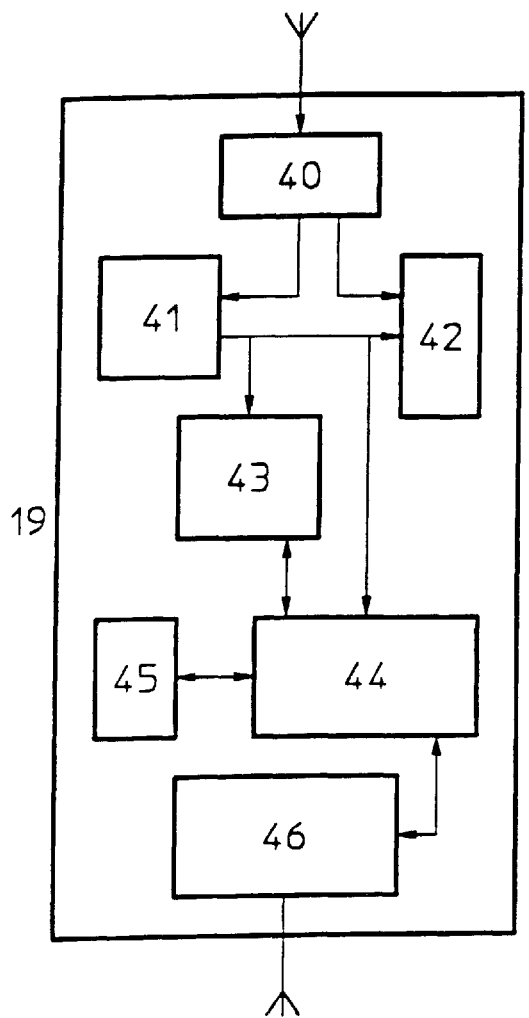
Figure 1:
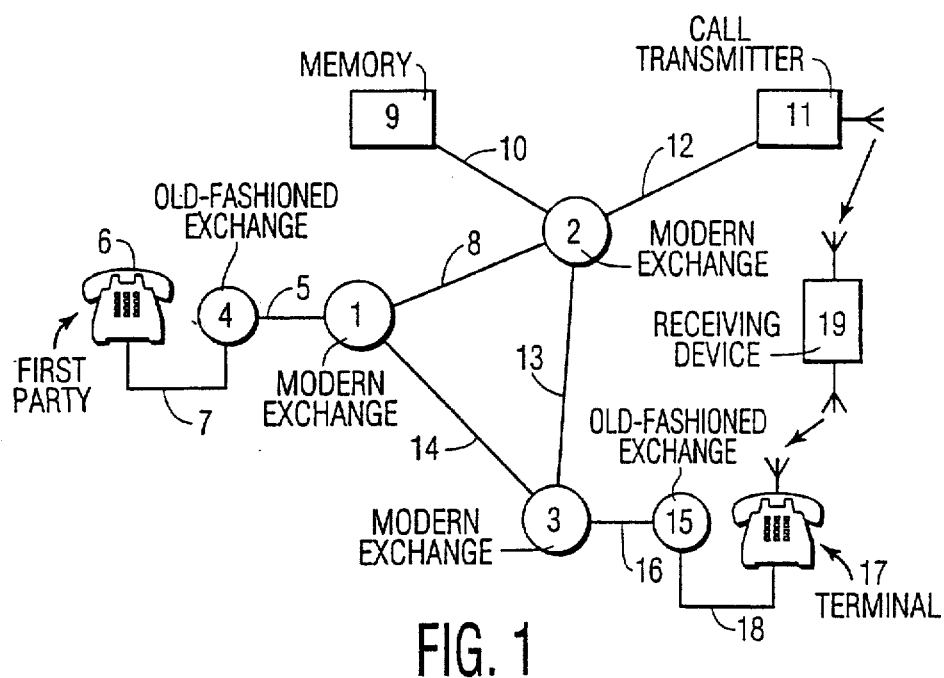
Figure 2:
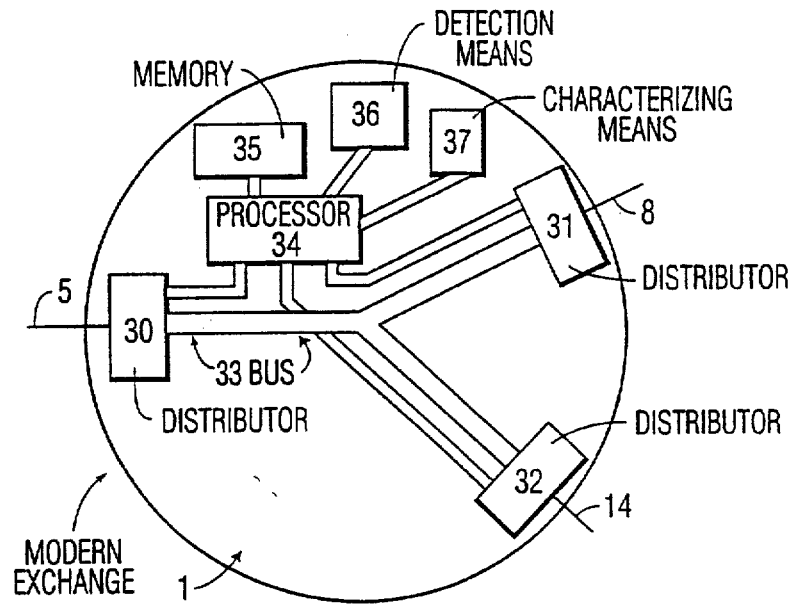
Figure 3:
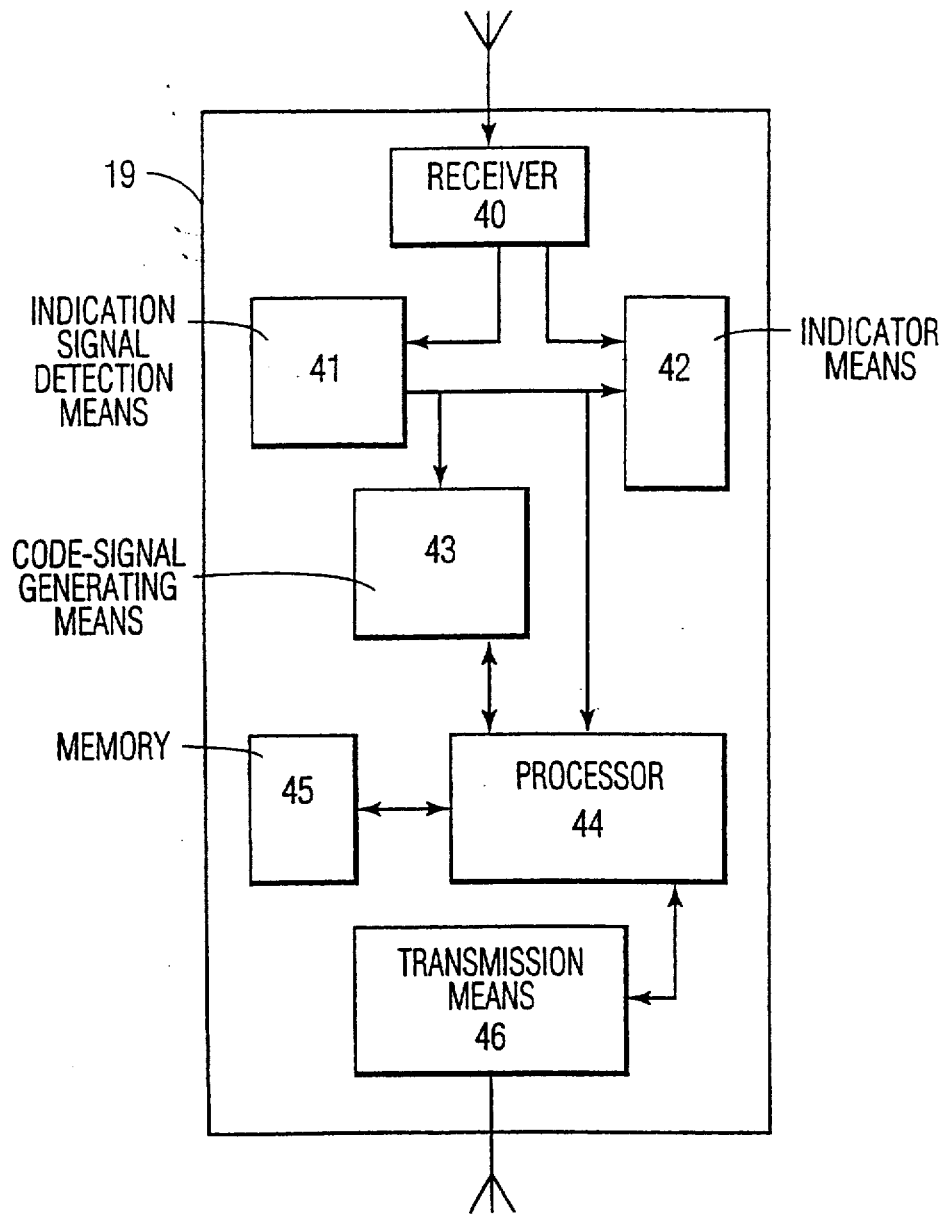

The invention will be explained in greater detail with reference to an exemplary embodiment shown in the figures. In the latter:

FIG. 1 shows a telecommunication system according to the invention for applying a method according to the invention, FIG. 2 shows a modern exchange for application in a telecommunication system according to the invention, and FIG. 3 shows a receiving device for application in a telecommunication system according to the invention.

The telecommunication system according to the invention shown in FIG. 1 for applying a method according to the invention comprises a first modern exchange 1, a second modern exchange 2 and a third modern exchange 3, all three being, for example, of the SSP (service switching point) type. Exchange 1 is connected to exchange 2 via a connection 8 and to exchange 3 via a connection 14, and exchange 2 is connected to exchange 3 via a connection 13. Exchange 1 is connected via a connection 5 to an old-fashioned exchange 4, which is coupled to a first party 6 (a subscriber having, for example, a permanently connected telephone set) via a link 7. Exchange 2 is connected to a memory 9 via a connection 10 and to a call transmitter 11 (for example, a paging transmitter) via a connection 12. Exchange 3 is connected via a connection 16 to an old-fashioned exchange 15, which is connected to a terminal 17 via a link 18. A second party has a receiving device (paging receiver) 19 for receiving a call signal (paging signal) from call transmitter (paging transmitter) 11 and for transmitting a code signal to terminal 17. All the connections 5, 8, 10, 12, 13, 14 and 16 mentioned comprise various links.

The modern exchange 1 shown in FIG. 2 for application in a telecommunication system according to the invention comprises a distributor 30 connected to connection 5, a distributor 31 connected to connection 8 and a distributor 32 connected to connection 14. All three distributors 30, 31 and 32 are separately coupled to a processor 34 (which is furthermore coupled, for example, to an SCP, or service control point, not shown in FIG. 2, which SCP may be connected to exchange 9 either via exchange 2 or directly) and are mutually coupled via a bus 33, processor 34 regulating the access of distributors 30, 31 and 32 to said bus 33. Processor 34 is furthermore coupled to a memory 35, to detection means 36 and means 37. Detection means 36 comprise identification detection means for the detection of an identification signal originating from the first party 6 for identifying the second party, and the activation of the call transmitter 11 (paging transmitter) for transmitting a call signal to the second party, code detection means for the detection of a code signal originating from the second party via the terminal, and the setting-up of a connection between the terminal and the exchange (comprising at least one link per connection) in response to at least a section of the code signal, and link detection means for the detection of the interruption of the link (comprising link 7 and a link in connection 5) between the first party 6 and the exchange 1, as a result of which a detected identification signal is defined as an identification signal of one type, the detection of the presence of the link (comprising link 7 and a link in connection 5) between the first party 6 and the exchange 1, as a result of which a detected identification signal is defined as an identification signal of another type, and indication-signal generating means for
the generation of an indication signal, associated with the call signal, of one type in the case of a detected identification signal of one type,
the generation of an indication signal, associated with the call signal, of another type in the case of a detected identification signal of another type.

Means 37 comprise characterizing means and characterizing further means and are designed for
the storage of a relationship between the second party and at least a section of the link situated between the first party 6 and the exchange 1 (comprising link 7 and a link in connection 5) at a location in the memory 9 in response to at least a section of the identification signal,
the reading-out of the location in the memory 9 in response to the detection of the code signal, and
the setting-up of the connection (comprising at least one link per connection) between the terminal 17 and exchange 1 in response to the relationship.

Exchange 2 and exchange 3 will be constructed similarly to exchange 1, components from exchanges 2 and 3 which are not shown in the figures and which correspond to components in exchange 1 shown in FIG. 2 being indicated in the text below by single and double primes respectively. Memory 9 might be completely identical to a memory 35' associated with exchange 2 and not shown in the figures or might be an extension of such a memory 35' associated with exchange 2. It is also possible, however, that memory 9 is a memory which is added to exchange 2 and which is coupled in a completely separate way to a processor 34' associated with exchange 2 and not shown in the figures.

The receiving device 19 (paging receiver) shown in FIG. 3 for application in a telecommunication system according to the invention comprises receiver 40 for receiving a call signal (paging signal). Receiving device 19 furthermore comprises indication-signal detection means 41 coupled to the receiver 40 for the detection of an indication signal, associated with the paging signal, of one type, for example, in the case of the interruption of the link (comprising link 7 and a link in connection 5) between the party 6 calling the terminal 17 and the exchange 1 and for the detection of an indication signal, associated with the paging signal, of another type, for example in the case of the presence of the link (comprising link 7 and a link in connection 5) between the party 6 calling the terminal 17 and the exchange 1. Receiving device 19 also has code-signal generating means 43 coupled to indication-signal detection means 41 for generating the code signal of one type in response to an indication signal of one type and for generating the code signal of another type in response to an indication signal of another type. Indicator means 42 indicate the indication signal of one type in the case of a detected indication signal of one type and indicate the indication signal of another type in the case of a detected indication signal of another type. The indication signal and the code signal are both fed to a processor 44, which is coupled to a memory 45 and to transmission means 46, which serve to transmit the code signal to the terminal 17. Transmission means 46 are designed, for example, as infrared/ultrasonic transmission means, in which case terminal 17 should be provided with infrared/ultrasonic receiving means. Transmission means 46 might also be designed as a smart-card writer, the code signal then being written to such a smart card. In this case, terminal 17 should have a smart-card reader and the smart card must be removed from the writer by the second party after having been read in and then placed in the reader of terminal 17.

The operation is as follows. First party 6 dials, for example via a fixed telephone set, a telephone number 06-5xxxxx, of which the section 06-5 indicates that it relates to a paging number and of which xxxxx indicates which receiving device 19 should be called. In this case, the entire number 06-5xxxxx functions as an identification signal. Exchange 4 is only capable of routing this number received via link 7 through to exchange 1 via a link in connection 5. In exchange 1, the number is recognized by detection means 36 (which comprise, inter alia, identification detection means) via distributor 30 and processor 34 as being an identification signal for a receiver 40, for example as a result of comparing the first three digits 06-5 as digital pulses with permanently stored pulses. After this recognition, the digits xxxxx are transmitted, together with, for example, an internal number of exchange 1 which indicates via which link in connection 5 and distributor 30 the first party 6 is connected, to exchange 2 via a data link in connection 8 by means of bus 33 and distributor 31 under the control of processor 34. In this context, said internal number therefore forms the section of the link situated between first party 6 and exchange 1, the relationship, which is formed in this case by a cross-reference between the internal number and the digits xxxxx, being present between said section and receiving device 19. In exchange 2, said internal number and the digits xxxxx are fed, under the control of a processor 34' not shown in the figures, to memory 9 via a data link in connection 10, in which memory the internal number is stored, for example, at location xxxxx. Furthermore, the digits xxxxx are fed, under the control of a processor 34' not shown in the figures, via a data link in connection 12 to paging transmitter 11, which broadcasts the paging signal intended for receiver 40. Said paging signal comprises the digits xxxxx or a particular translation thereof for identifying receiver 40. Because the number dialled by first party 6 is recognized by the identification detection means associated with detection means 36, said identification means comprise activation means for activating call transmitter 11 in response to at least a section of the identification signal. As an alternative, it is possible for the internal number and the digits xxxxx to be fed to memory 9 via the SCP not shown in FIG. 2.

Detection means 36 (which furthermore comprise, inter alia, link detection means) detect, for example, the line-current variation in the link between first party 6 and exchange 1 by having said link regularly scanned by processor 34 via distributor 30 and comparing the scanned values thus obtained in detection means 36 with a fixed value. In response thereto, an indication signal of one type is generated by detection means 36 if the link is interrupted and an indication signal of another type is generated if the link is present. Said indication signal is added to the digits xxxxx by processor 34 and thus transmitted concomitantly to exchange 2 and paging transmitter 11 for addition to the paging signal intended for receiver 40.

Receiver 40 in receiving device 19 receives said paging signal and filters the digits xxxxx (or the translation thereof) out of the paging signal, after which whether said paging signal is intended for said receiver 40 is established by comparison. If this is so, the paging signal is fed to indication-signal detection means 41 which filter the indication signal out of the paging signal, after which whether it is an indication signal of one type or of another type is determined by comparison. Said indication signal is fed to indicator means 42, such as, for example, an LED, which does not light up in response to an indication signal of one type but does light up in response to an indication signal of another type. The indication signal is furthermore added to code-signal generating means 43, which generate a code signal of one type or another type in response to an indication signal of one type or another type, respectively. In the case of a code signal of one type (the link between first party 6 and exchange 1 is interrupted in this case), the telephone number of first party 6 (which is already known, for example, to the second party) should, for example, be dialled by the second party, for example via a keyboard present on the receiving device 19, after which the code signal of one type is transmitted by means of processor 44 via transmission means 46, for example by means of infrared/ultrasonic transmission or by means of a smart card. Said code signal of one type then comprises, for example, the number of first party 6, dialled by the second party, together with, for example, identification information originating from memory 45, such as, for example, xxxxx. In the case of a code signal of another type (the link between first party 6 and exchange 1 is still present in that case) the code ★78 should, for example, be dialled by the second party, after which the code signal of another type is transmitted by means of processor 44 via transmission means 46, for example by means of infrared/ultrasonic transmission or by means of a smart card. Said code signal of another type then comprises, for example, the code ★78, dialled by the second party, together with, for example, identification information originating from memory 45, such as, for example, xxxxx. It is also possible for code-signal generating means 43 to generate the code ★78 in response to an indication signal of another type. Of importance is the difference between code signals of one type (which contain the number of first party 6, as a result of which first party 6 is in fact called in a known manner) and code signals of another type (which comprise a special code, as a result of which a connection can be set up between the second party and the first party 6, who is still connected to exchange 1, at the expense of first party 6 and without an internal network number having to be dialled by the second party).

Terminal 17 receives the code signal of another type, for example by means of infrared/ultrasonic transmission or by means of a smart card, and transmits it through via link 18 to exchange 15, which is only capable of routing the signal through to exchange 3 via a link in connection 16. Exchange 3 has detection means 36" (which comprise, inter alia, code detection means) which are not shown in the figures and which recognize said code signal of another type by means of a processor 34" not shown in the figures, for example by comparing the special code ★78 as digital pulses with permanently stored pulses. Exchange 3 furthermore has means 37" which are not shown in the figures and which generate, in response to the recognition, a code yyy which is related to exchange 3 and which is transmitted, together with the digits xxxxx of the code signal of another type, to exchange 2 via a data link in connection 13 under the control of the processor 34" not shown in the figures. In exchange 2, said code yyy related to exchange 3 is detected by detection means 36' (which comprise, inter alia, code detection means) which are not shown in the figures and which recognize said code yyy related to exchange 3 by means of a processor 34' not shown in the figures, for example by comparing the code yyy related to exchange 3 as digital pulses with permanently stored pulses. After this recognition, the digits xxxxx are fed under the control of the processor 34' not shown in the figures to memory 9, which, in response thereto, generates the internal number of exchange 1 which is stored at the location associated with the digits xxxxx and which indicates via which link in connection 5 and distributor 30 the party 6 is connected.

Said internal number of exchange 1 is transmitted, together with the digits xxxxx and the code yyy related to exchange 3, to exchange 3 via a data link in connection 13 under the control of the processor 34' not shown in the figures. In exchange 3, the code yyy related to exchange 3 is detected (either by the means 37" not shown in the figures or by the detection means 36" not shown in the figures), after which the connection set up so far (characterized by the digits xxxxx, the information, via which link in connection 16 terminal 17 is connected to exchange 3, being stored in a memory 35" not shown in the figures, on the basis of said digits xxxxx) is routed through to exchange 3 from terminal 17 by means 37" not shown in the figures and, under the control of the processor 34" not shown in the figures, to exchange 1 on the basis of the internal number which indicates via which link in connection 5 and distributor 30 the first party 6 is connected to exchange 1. In exchange 1, the last section of the connection between first party 6 and receiving device 19 is then set up, after which first party 6 and the second party can talk to one another and all the costs may be allocated to first party 6, without an internal network number being made known to first party 6 or to the second party.

Instead of indicating via which link in connection 5 and distributor 30 the first party 6 is connected to exchange 1, the internal number of exchange 1 might also define exchange 1 only, in which case the information, via which link in connection 5 and distributor 30 the first party 6 is connected to exchange 1, should be stored in memory 35, for example, on the basis of the digits xxxxx. In this last case, the digits xxxxx, together with the internal number of exchange 1, should be transmitted concomitantly during the routing-through from exchange 3 to exchange 1.

Code detection means associated with detection means 36 (and 36' and 36") and means 37 (and 37' and 37") are situated in exchanges 1, 2 and 3. Both means may each also be sited in a terminal, which should be provided with a processor for controlling said means. Preferably, both means are situated in the vicinity of one another. This last remark also applies to the two identification detection means and link detection means associated with detection means 36 (and 36' and 36"). In one embodiment, all the means associated with detection means 36 (and 36' and 36") and means 37 (and 37' and 37") are implemented in terms of software by means of a processor already present.

Instead of making use of the code yyy related to exchange 3 for the transmission of the digits xxxxx from exchange 3 via a data link in connection 13 to exchange 2 and for the transmission of the internal number and the digits xxxxx from exchange 2 via the data link in connection 13 to exchange 3, it is also possible, of course, to transmit all this without such a code yyy related to exchange 3, for example by using one particular time slot of the said data link, in which case exchanges should be informed about which time slot is associated with which information stream.

If the identification signal comprises a fixed telephone number aaa-bbbbbbb and codes then to be dialled by first party 6, such as the code xxxxx (which indicates which receiving device 19 should be called), a code ccc-ddddddd (which indicates, for example, the telephone number of first party 6) and a code zz (which indicates, for example, that first party 6 wishes to be accessed at an advanced level, for example because the first party intends to keep the connection between the first party and the exchange open, which code zz thus corresponds to an indication signal), exchange 4 will only be capable of routing said identification signal received via link 7 through to exchange 1 via a link in connection 5. In exchange 1, the fixed telephone number aaa-bbbbbbb is recognized by detection means 36 (which comprise, inter alia, identification detection means) via distributor 30 and processor 34, for example by comparing said number as digital pulses with permanently stored pulses, and the code zz is recognized by detection means 36 (which furthermore comprise, inter alia, link detection means) via distributor 30 and processor 34, for example by comparing said code zz as digital pulses with permanently stored pulses. After this recognition, the code xxxxx, the code ccc-ddddddd and the code zz are transmitted, together with, for example, an internal number of exchange 1 which indicates via which link in connection 5 and distributor 30 the first party 6 is connected, via a data link of connection 8 to exchange 2 by means of bus 33 and distributor 31 under the control of processor 34. In exchange 2, said internal number and the code xxxxx are fed to memory 9 via a data link in connection 10, where the internal number is stored, for example, at location xxxxx, under the control of the processor 34' not shown in the figures. Furthermore, the code xxxxx, the code ccc-ddddddd and the code zz are fed, under the control of a processor 34' not shown in the figures, via a data link in connection 12 to paging transmitter 11, which broadcasts the paging signal intended for receiver 40. Said paging signal comprises the code xxxxx for identifying receiver 40, the code ccc-ddddddd and the code zz.

Receiver 40 in receiving device 19 then receives said paging signal and filters the code xxxxx (and the code ccc-ddddddd) out of the paging signal, after which it is established by comparison whether said paging signal is intended for said receiver 40. If this is so, the paging signal is fed to indication detection means 41, which filter the code zz out of the paging signal, after which whether the code zz has a particular value is determined by comparison. Indicator means 42 such as, for example in this case, a display, show in response to the code ccc-ddddddd the telephone number of the first party 6 and show in response to the code zz a particular symbol which indicates that said code zz has a particular value. Code zz is furthermore fed to code-signal generating means 43 which, in response to the particular value of the code zz, generate a code signal of another type. In the case of said code signal of another type (first party 6 in fact wishes to be accessed at an advanced level), the code ★78, for example, is automatically generated, after which the code signal of another type is transmitted by means of processor 44 via transmission means 46, for example by means of infrared/ultrasonic transmission or by means of a smart card. Said code signal of another type then comprises, for example, the code ★78 dialled by the second party, together with, for example, identification information originating from memory 45 such as, for example, the code xxxxx, etc.

In the operation described above, it has been assumed that first party 6 remains connected to exchange 1 during the setting up of the communication connection. This maintenance of connection is detected by the link detection means or because first party 6 generates the code zz. After generation of the identification signal of another type by first party 6, there is, however, also the possibility that first party 6 breaks the connection to exchange 1, while a communication connection is nevertheless then set up to second party 19 without the latter being informed of the internal network number of exchange 1 and of the number of first party 6. This is done by again having first party 6 generate, for example, the fixed telephone number aaa-bbbbbbb and the codes xxxxx and zz and by then feeding not the internal number of exchange 1 but, instead thereof, the number of first party 6 and the code xxxxx to memory 9, and by storing the number of first party 6 at location xxxxx. All this has the result that the communication connection is set up between second party 19 and the first party 6, who is notified by a warning signal, from terminal 17, via exchange 3 and, after memory 9 has been read out, via exchange 1. The meaning of code zz (that first party 6 wishes or does not wish to be accessed at an advanced level) might therefore be extended, for example, by standardization to include a meaning relating to whether or not the connection between first party 6 and exchange remains open, but it is also conceivable that the code zz is split up into a code zz1 and a code zz2. As described earlier, whether the connection remains open or not might also be detected by the exchange, in which case no splitting-up of the code zz and/or extension of the meaning thereof is necessary.

Instead of the special data links in the connections, use might also be made of standard links which are intended for telephone traffic, for example by application of modems or by application of special internal telephone numbers and codes associated therewith, or use might be made of links associated with a signalling network.

If the method according to the invention, the telecommunication system according to the invention and the receiving device according to the invention are used in an analog environment, certain analog signals should be converted into digital signals at points known to the person skilled in the art by conversion and/or interpretation, in which case use might be made, for example, of the contents of Dutch Patent Application 9301094.

An example of a second party who cannot be called by wire-free means is a user who is situated in a room, with a terminal having a display present in said room, on which display there appears a message originating from a first party and intended for the user, after which the user generates by means of another terminal, situated in another room, his code signal, for example because there are other persons situated in the first room mentioned in respect of whom a call proceeding via the communication connection between the first party and the second party is of too confidential a nature.

We claim:

1. A method for setting up a communication connection between a first party and a callable second party, the method comprising the steps of:

receiving by a first exchange an identification signal for identifying the second party, which identification signal has been generated by the first party via a first terminal;

storing a relationship between the second party and at least a section of a link situated between the first terminal and the first exchange at a location in a memory in response to at least a section of the identification signal;

activating a call transmitter for transmitting a call signal to the second party;

receiving by a second exchange a code signal, which code signal has been generated by the second party via a second terminal;

reading-out the location in the memory in response to the code signal;

transmitting from the memory to the second exchange of at least a section of the relationship; and then setting up a connection between the second exchange and the first exchange in response to at least a section of the relationship.

2. The method according to claim 1, wherein the activation of the call transmitter for transmitting the call signal to the second party takes place in response to at least a section of the identification signal.

3. The method according to claim 2, wherein the call transmitter transmits a call signal which comprises an indication signal of one type in the case of an identification signal of one type and transmits a call signal which comprises an indication signal of another type in the case of an identification signal of another type.

4. The method according to claim 1, wherein:
the relationship is formed by a representation of at least a section of the link situated between the first terminal and the first exchange; and
the location in the memory is determined by at least a section of the identification signal.

5. The method according to claim 2, wherein:
the relationship is formed by a representation of at least a section of the link situated between the first terminal and the first exchange; and
the location in the memory is determined by at least a section of the identification signal.

6. The method according to claim 3, wherein:
the relationship is formed by a representation of at least a section of the link situated between the first terminal and the first exchange; and
the location in the memory is determined by at least a section of the identification signal.

7. A telecommunication system comprising:
at least a first exchange and a second exchange, a first party being capable of being coupled to the first exchange via a first terminal and via a link, and a callable second party being capable of being coupled to the second exchange via a second terminal;
identification detection means for detecting an identification signal, originating from the first party via the first terminal and via the link, for identifying the second party;
a call transmitter for transmitting a call signal to the second party;
code detection means for detecting a code signal originating from the second party via the second terminal;
means for, in response to at least a section of the identification signal, storing a relationship between the second party and at least a section of the link situated between the first terminal and the first exchange at a location in a memory; and
means for consecutively:
reading out the location in the memory in response to the detection of the code signal;
transmitting at least a section of the relationship from the memory to the second exchange; and
then setting up the connection between the second exchange and the first exchange in response to at least a section of the relationship.

8. The telecommunication system according to claim 7, wherein the identification detection means includes activation means for activating the call transmitter for transmitting a call signal to the second party in response to at least a section of the identification signal.

9. The telecommunication system according to claim 8, further comprising:
indication-signal generating means for:
generating an indication signal, associated with the call signal, of one type in the case of a detected identification signal of one type; and
generating an indication signal, associated with the call signal, of another type in the case of a detected identification signal of another type.

10. The telecommunication system according to claim 7, wherein the relationship is a representation of at least a section of the link between the first terminal and the first exchange, the location in the memory being determined by at least a section of the identification signal.

11. The telecommunication system according to claim 8, wherein the relationship is a representation of at least a section of the link between the first terminal and the first exchange, the location in the memory being determined by at least a section of the identification signal.

12. The telecommunication system according to claim 9, wherein the relationship is a representation of at least a section of the link between the first terminal and the first exchange, the location in the memory being determined by at least a section of the identification signal.

13. A telecommunication system comprising:
at least a first exchange and a second exchange, a first party being capable of being coupled to the first exchange via a first terminal and via a link, and a callable second party being capable of being coupled to the second exchange via a second terminal;
an identification detector which detects an identification signal, originating from the first party via the first terminal and via the link, for identifying the second party;
a call transmitter for transmitting a call signal to the second party;
a code detector for detecting a code signal originating from the second party via the second terminal;
a circuit which, in response to at least a section of the identification signal, stores a relationship between the second party and at least a section of the link situated between the first terminal and the first exchange at a location in a memory; and
a circuit which consecutively:
reads out the location in the memory in response to the detection of the code signal;
transmits at least a section of the relationship from the memory to the second exchange; and
then sets up the connection between the second exchange and the first exchange in response to at least a section of the relationship.

14. The telecommunication system according to claim 13, wherein the identification detector includes an activation circuit which activates the call transmitter to transmit a call signal to the second party in response to at least a section of the identification signal.

15. The telecommunication system according to claim 14, further comprising:
an indication-signal generator which:
generates an indication signal, associated with the call signal, of one type in the case of a detected identification signal of one type; and
generates an indication signal, associated with the call signal, of another type in the case of a detected identification signal of another type.

16. The telecommunication system according to claim 13, wherein the relationship is a representation of at least a section of the link between the first terminal and the first exchange, the location in the memory being determined by at least a section of the identification signal.

17. The telecommunication system according to claim 14, wherein the relationship is a representation of at least a section of the link between the first terminal and the first exchange, the location in the memory being determined by at least a section of the identification signal.

18. The telecommunication system according to claim 15, wherein the relationship is a representation of at least a section of the link between the first terminal and the first exchange, the location in the memory being determined by at least a section of the identification signal.

* * * * *

UNITED STATES PATENT AND TRADEMARK OFFICE
CERTIFICATE OF CORRECTION

PATENT NO. : 5,884,161
DATED : March 16, 1999
INVENTOR(S) : Hegeman

It is certified that error appears in the above-identified patent and that said Letters Patent is hereby corrected as shown below:

The title page, showing the illustrative Figures, should be deleted to appear as per the attached title page.

The Drawing Sheet, consisting of Figs. 1-3, should be deleted to be replaced with the Drawing Sheets, consisting of Figs.1-3, as shown on the attached page.

Signed and Sealed this

Eleventh Day of July, 2000

*Attest:*

Q. TODD DICKINSON

*Attesting Officer*     *Director of Patents and Trademarks*

United States Patent [19]

Hegeman

[11] Patent Number: 5,884,161
[45] Date of Patent: Mar. 16, 1999

[54] METHOD FOR SETTING UP A COMMUNICATION CONNECTION BETWEEN A FIRST PARTY AND A CALLABLE SECOND PARTY, A TELECOMMUNICATION SYSTEM FOR APPLYING THE METHOD, AND A RECEIVING DEVICE FOR RECEIVING A CALL SIGNAL OF A CALL TRANSMITTER THEREFOR

[75] Inventor: Johannes Hegeman, Delft, Netherlands

[73] Assignee: Koninklijke PTT Nederland N.V., Groningen, Netherlands

[21] Appl. No.: 375,427

[22] Filed: Jan. 18, 1995

[30] Foreign Application Priority Data

Jan. 27, 1994 [NL] Netherlands ............... 9400118

[51] Int. Cl.⁶ ........................................... H04Q 7/38
[52] U.S. Cl. ........................... 455/414; 455/458; 455/560
[58] Field of Search ............................. 379/56, 57, 58, 379/63, 220; 455/414, 417, 422, 403, 445, 458, 459, 460, 461, 313, 560

[56] References Cited

U.S. PATENT DOCUMENTS

| 5,090,051 | 2/1992 | Muppidi et al. ............... 379/61 |
| 5,414,750 | 5/1995 | Bhagat et al. ............... 379/57 |
| 5,430,790 | 7/1995 | Williams ............... 379/63 |
| 5,491,739 | 2/1996 | Wadin et al. ............... 379/57 |
| 5,557,652 | 9/1996 | Jonsson ............... 379/57 |

FOREIGN PATENT DOCUMENTS

| 0 478 213 A3 | 4/1992 | European Pat. Off. . |
| 0 632 633 A1 | 1/1995 | European Pat. Off. . |
| 2 263 845 | 8/1993 | United Kingdom . |
| WO 93/05604 | 3/1993 | WIPO . |
| WO 93/18624 | 9/1993 | WIPO ............... 379/57 |

*Primary Examiner*—Dwayne Bost
*Assistant Examiner*—William G. Trost
*Attorney, Agent, or Firm*—Frishauf, Holtz, Goodman, Langer & Chick

[57] ABSTRACT

The method for setting up a communication connection in a universal personal telecommunication (UPT) system between a first party and a second party who can be called, often by a wire-free system, offers the possibility of setting up the communication connection without an internal network telephone number having to be transmitted concomitantly in a call signal by storing, in a memory, a relationship between the two parties and at least a section of a link situated between the first party and an exchange and by first reading out the memory in response to a code signal originating from the second party which is detected via a terminal and then to carrying out routing on the basis of the relationship read out.

18 Claims, 2 Drawing Sheets

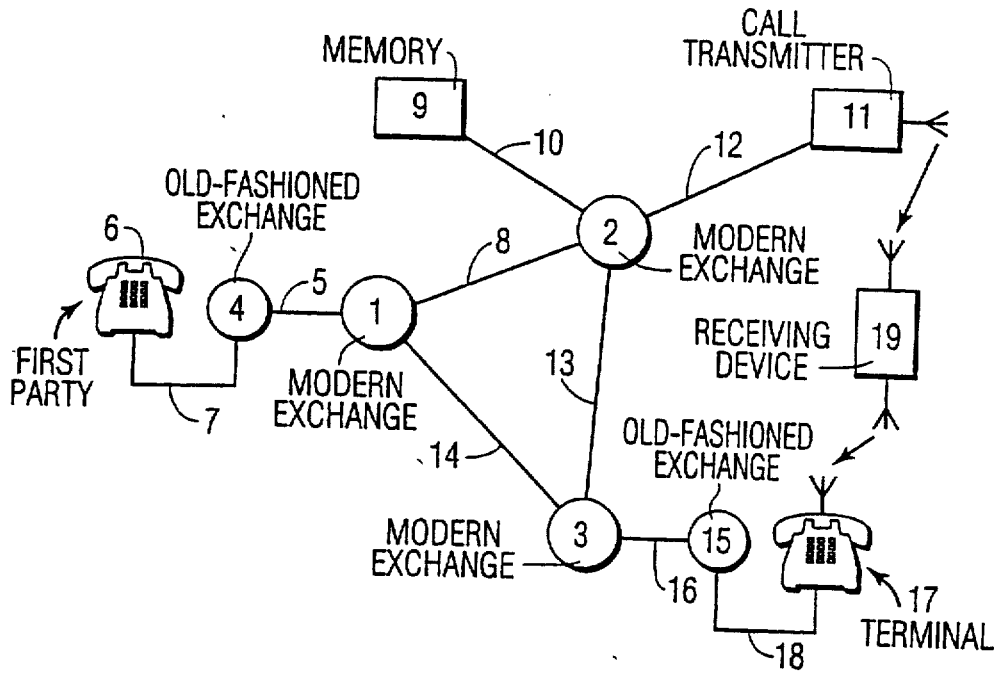

UNITED STATES PATENT AND TRADEMARK OFFICE
CERTIFICATE OF CORRECTION

PATENT NO. : 5,884,161  
DATED : March 16, 1999  
INVENTOR(S) : Johannes Hegeman It is certified that error appears in the above-identified patent and that said Letters Patent is hereby corrected as shown below:

Column 7,
Delete lines 40-60, and replace with:

-- 
- GB 2 263 845
- EP 0 478 213
- WO 93/07704
- NL 93/01094
- NL 94/00118 --

Signed and Sealed this

Eighteenth Day of September, 2001

Attest:

Attesting Officer

NICHOLAS P. GODICI  
*Acting Director of the United States Patent and Trademark Office*